Aug. 17, 1971  F. A. REINHARDT  3,600,257
LIGHTWEIGHT MIRROR STRUCTURES
Filed Jan. 9, 1969
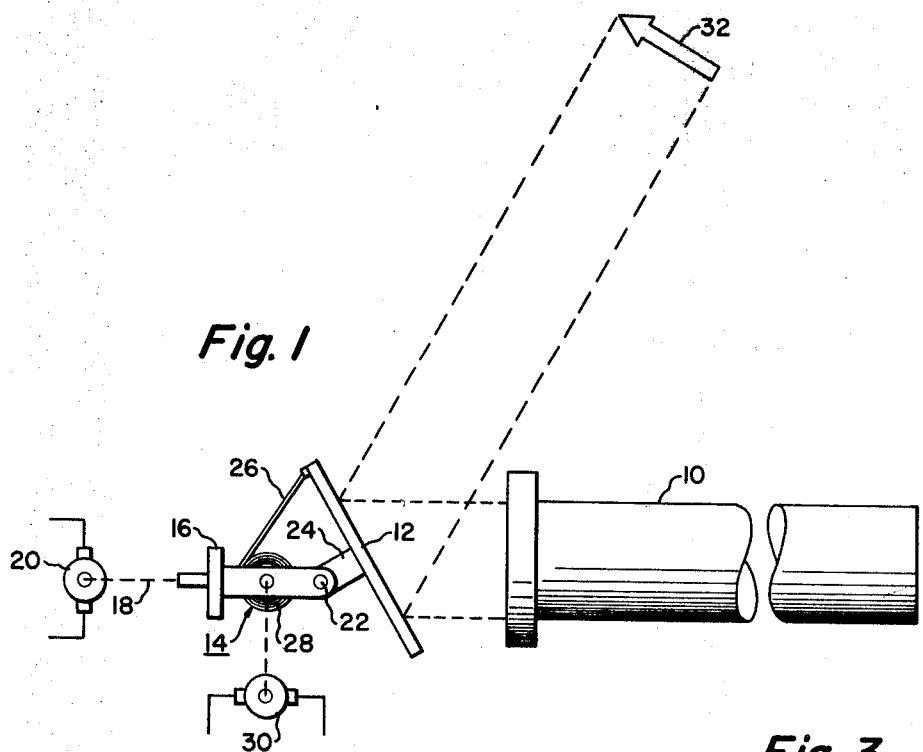
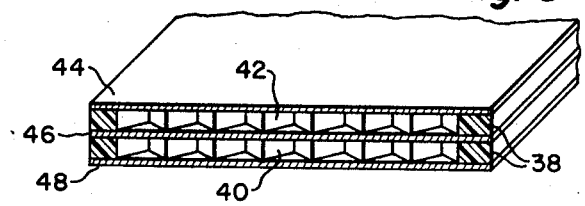
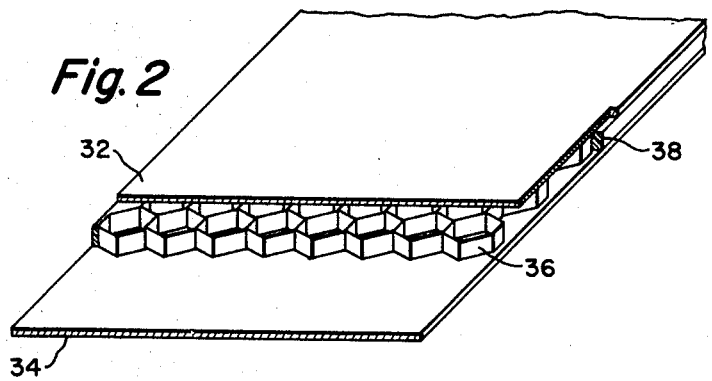
INVENTOR.
FREDERICK A. REINHARDT
BY
Ernest P. Kliphel
ATTORNEY 3,600,257
LIGHTWEIGHT MIRROR STRUCTURES
Frederick A. Reinhardt, Severna Park, Md., assignor to Westinghouse Electric Corporation, Pittsburgh, Pa.
Filed Jan. 9, 1969, Ser. No. 789,984
Int. Cl. G02b 5/08; B32b 3/12; B21d 47/00
U.S. Cl. 161—4                     1 Claim

ABSTRACT OF THE DISCLOSURE

Described are lightweight mirror structures comprising a stainless steel honeycomb core sandwiched between sheets of beryllium, the assembly being secured together by a suitable binder such as a plastic adhesive or the like.

BACKGROUND OF THE INVENTION

The classical material used for astronomical and other high quality mirrors has been glass with a thickness of approximately one-sixth its diameter. Such structures, however, are relatively heavy; and this weight imposes a severe penalty on any system requiring movement, as in scanning, or where weight is of primary importance as in space applications. In an effort to reduce the weight of glass mirrors, cast or molded glass blanks with honeycomb-like reinforcing ribs have been developed; however such structures have a relative thick cross section and relatively small savings in weight is achieved.

In the case where mirrors of relatively large cross-sectional area are used to scan a field of view, they are usually centrally supported on a gimbal for scanning movement in two dimensions, the edges of the mirror being suspended from the gimbal in cantilever relationship. This means that the mirror must have a high degree of stiffness or bending strength, the degree of stiffness being determined by the amount of optical distortion which can be tolerated.

Glass mirrors can be replaced for scanning and lightweight applications by solid beryllium plates which have low densities and very high inherent stiffness. Here again, however, the required thickness of the beryllium plate is substantial and the savings in weight over glass unimpressive.

SUMMARY OF THE INVENTION

As an overall object, the present invention seeks to provide a new and improved mirror assembly comprising a honeycomb structure sandwiched between a pair of metallic sheets.

More specifically, an object of the invention is to provide a mirror assembly of the type described comprising a metal honeycomb sandwiched between a pair of beryllium plates, one of said plates being coated with a reflective material to form a mirror.

In accordance with the invention, a mirror construction is provided comprising a honeycomb of metallic strip material, preferably stainless steel containing about 15% chromium and 7% nickel, sandwiched between and secured to a pair of beryllium plates by a plastic adhesive or other suitable bonding agent, such as brazing. With this combinnation, weight savings as high as 10 to 1 are possible over a solid beryllium plate without loss of stiffness.

The above and other objects and features of the invention will become apparent from the following detailed description taken in connection with the accompanying drawings which form a part of this specification, and in which:

FIG. 1 is an illustration of a typical application of the mirror structure of the present invention;

FIG. 2 is a partially broken-away view of the mirror structure of the invention; and FIG. 3 is a partially broken-away view of another embodiment of the invention.

With reference now to the drawings, and particularly to FIG. 1, a television camera tube 10, such as a vidicon, is shown together with an optical scanning assembly comprising a flat mirror 12 mounted on a gimbal 14. As shown, the gimbal 14 includes a first member 16 rotatable about an axis 18 by means of a motor 20. Mounted on the rotatable member 16, for pivotal movement about axis 22, is a second assembly 24 which carries the flat mirror 12. The mirror 12 is connected, at its upper end, to the end of a web 26 mounted upon spool 28 which is driven by motor 30. With this arrangement, it will be appreciated that the mirror 12 may be rotated about one axis 18 by rotation of the member 16, and rotated about the other axis 22 at right angles thereto by rotation of the motor 30 to effect a two-dimensional scanning action. Thus, the image of an object 32 will be reflected from the mirror 12 onto the photosensitive surface of the camera tube 10.

As will be appreciated, mirrors, such as the mirror 12, become quite large in size and must remain perfectly flat. Since the mirror is supported at its center only, with the remaining portions of the mirror being supported in cantilever beam relationship, the material from which the mirror is formed must have a high degree of stiffness or bending strength and at the same time must be lightweight.

One embodiment of the mirror of the present invention is shown in FIG. 2 and comprises upper and lower sheets 32 and 34 of commercially available beryllium on either side of a honeycomb structure 36 formed from stainless steel strip material, preferably stainless steel containing about 15% chromium and 7% nickel. This material has about the same coefficient of thermal expansion as the beryllium sheets. Consequently, thermal stresses due to different rates of expansion and consequent out-of-flat conditions are eliminated. In the illustrated embodiment, the honeycomb structure is made up of interlocked hexagons; however the configuration of the respective polygons may be varied to suit requirements. It will be understood, however, that other materials, such as beryllium itself, could be used to form the honeycomb, the important consideration being that the coefficient of thermal expansion of the honeycomb approximates that of the beryllium.

In the manufacture of the assembly of FIG. 2, the opposing surfaces of the two beryllium sheets 32 and 34 are covered with thermosetting epoxy resin sheets, preferably MMAF–11 epoxy sheets manufactured by Minnesota Mining and Manufacturing Company. The honeycomb structure 36 is placed between the sheets and the completed assembly bonded in a laminating press at about 350° F. Pressure is used to develop maximum flatness between the flat platens of the press. After curing, all edges of the assembly are sealed using a room temperature setting liquid epoxy 38, preferably the epoxy resin sold under the trademark "HYSOL 1C" and manufactured by Hysol Corp., Olean, N.Y. This seal serves two purposes. First, it provides a barrier to prevent plating solution from entering the core during plating operations and also prevents outgassing products of the bond material from contaminating the optical surface after grinding and during the aluminizing operation. The complete sandwich is then masked and the optical surface plated by the electroless nickel process. The plated assembly is now ready for optical polishing to the required flatness followed by aluminizing and overcoating in the conventional way. As an alternative to the thermosetting epoxy resin, other suitable bonding agents can be used, including brazing.

In FIG. 3, another embodiment of the invention is shown wherein two honeycomb structures 40 and 42 are sandwiched between three beryllium sheets 44, 46 and 48. The assembly of FIG. 3 is particularly adaptable for use in fabricating exceptionally large reflectors where thickness requirements preclude the use of a single honeycomb core. Additional sheets of beryllium, separated by honeycomb structures can be used in the assembly of FIG. 3, if necessary.

As will be appreciated, assemblies, such as that shown in FIGS. 2 and 3, can be curved with suitable tooling to form concave and convex optical reflectors as desired.

A mirror assembly constructed in accordance with the teachings of the invention where the thickness of the sheets 32 and 34 is 0.060 inch each and the overall thickness of the assembly, including the honeycomb is 0.268 inch, has the same stiffness as a solid beryllium plate having a thickness of 0.250 inch. At the same time, the weight of a solid beryllium plate having a thickness of 0.250 inch is 0.0167 pound per square inch as compared with the structure of the present invention having a total thickness of 0.268 inch but a weight of only .0087 pound per square inch. Thus, the weight is reduced by about one-half with no loss in bending strength. In general, it can be said that the core size and face plate thickness are chosen to obtain the optimum weight consistent with processing and stiffness requirements.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A mirror structure comprising a honeycomb formed from metal strip material sandwiched between a pair of beryllium plates and secured thereto by a bonding agent, said metal strip material comprising stainless steel containing about 15% chromium and 7% nickel and having a coefficient of thermal expansion approximating that of beryllium.

References Cited

UNITED STATES PATENTS

| | | | |
|---|---|---|---|
| 2,988,959 | 6/1961 | Pelkey et al. | 161—68X |
| 3,447,803 | 6/1969 | Kucheck | 161—43X |
| 3,453,041 | 7/1969 | Rantsch | 350—310 |
| 3,489,484 | 1/1970 | Brown | 350—310 |
| 3,501,367 | 3/1970 | Parker | 52—615X |
| 3,501,878 | 3/1970 | Segal | 52—615X |
| 3,507,633 | 4/1970 | Dewez | 29—195X |
| 3,507,737 | 4/1970 | Busdiecker et al. | 161—4 |
| 3,514,275 | 5/1970 | Bray | 161—68X |
| 3,516,895 | 6/1970 | Hartman | 161—68 |
| 3,532,158 | 10/1970 | Hiebert | 52—615X |

OTHER REFERENCES

Beryllium Technology, vol. 2, metallurgical society conferences, Philadelphia: 1964, pp. 892, 896, 975, and 1020–1021.

HAROLD ANSHER, Primary Examiner

U.S. Cl. X.R.

29—196; 52—615; 75—128; 161—43, 68, 186; 350—310